H. B. EWBANK, Jr.
METHOD OF CONTROLLING ELECTRICAL POWER TRANSMISSION.
APPLICATION FILED MAY 1, 1916.
1,265,184.
Patented May 7, 1918.
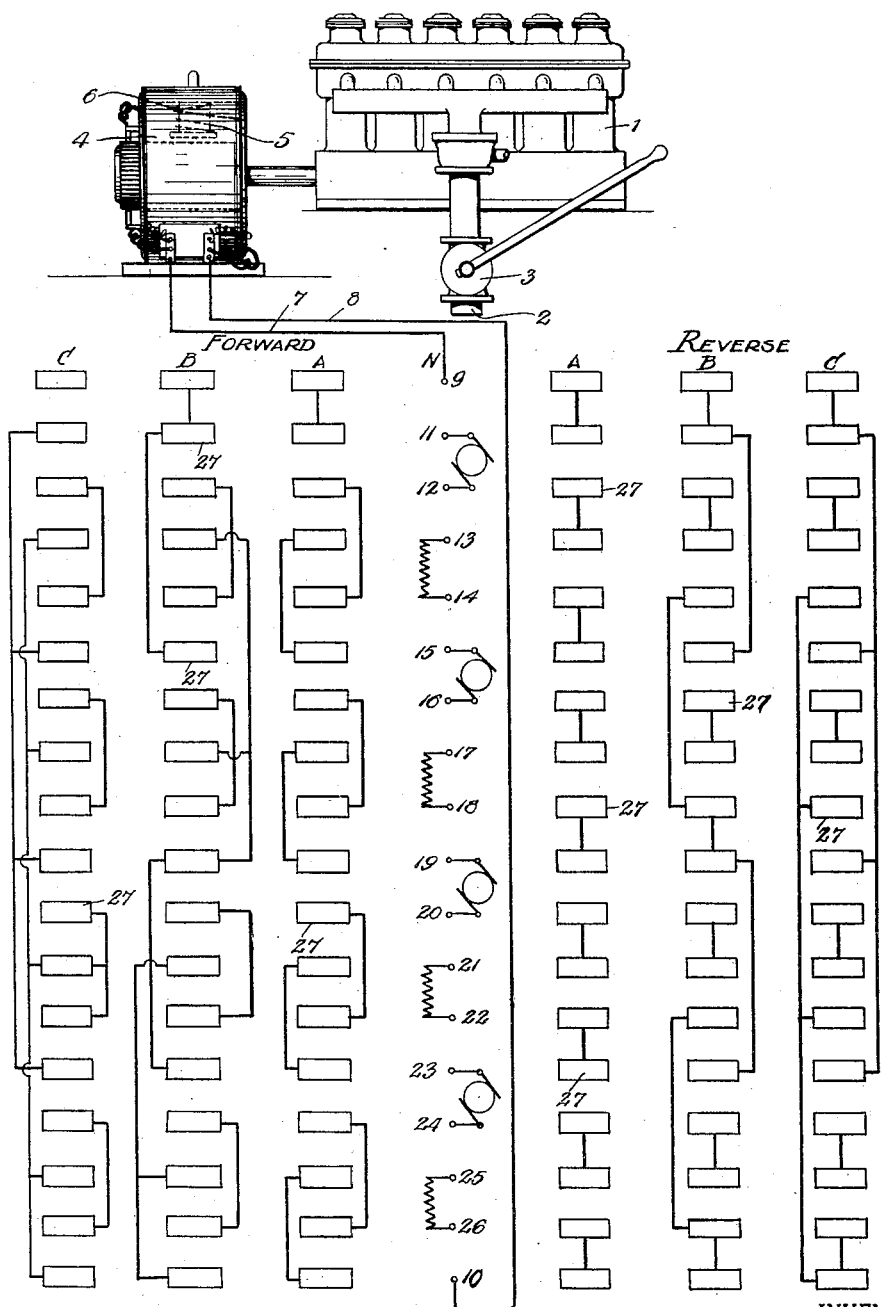
INVENTOR.
Herbert Bryan Ewbank Jr.
BY
ATTORNEYS.

UNITED STATES PATENT OFFICE.

HERBERT BRYAN EWBANK, JR., OF PORTLAND, OREGON.

METHOD OF CONTROLLING ELECTRICAL-POWER TRANSMISSION.

1,265,184.  Specification of Letters Patent.  Patented May 7, 1918.

Application filed May 1, 1916. Serial No. 94,696.

*To all whom it may concern:*

Be it known that I, HERBERT BRYAN EWBANK, Jr., a citizen of the United States, residing at Portland, in the county of Multnomah and State of Oregon, have invented new and useful Improvements in Methods of Controlling Electrical-Power Transmission, of which the following is a specification.

This invention relates to a method of controlling electrical power transmission and particularly to a method of control which may be utilized in electrical traction.

In electrical power transmission it has been the recognized practice to use a generator of constant E. M. F. or voltage and to vary the current in accordance with the requirements of the load by so-called field control, that is, by decreasing or increasing respectively either the field resistance or other resistances connected with power consuming aggregate or aggregates. It has furthermore been customary practice in power transmission systems to combine several motors of each power unit at different stages of the power consumption in different electrical connections; as, for instance, when several motors form each power unit, they are primarily connected in series and subsequently in parallel, each of these conditions of pure series and pure parallel connections being preceded by other imtermediary steps of connection, in which resistances are added either to the field coils of the motors or are placed in some other way in series with the motor.

If, for instance, each of the power units comprised four motors, it was the practice to connect these four motors first in series, then in series-parallel in groups of two, and finally in pure parallel. In order to effect pure series connection of the motors, they were first connected in series with starting resistances; these starting resistances were cut out in successive steps, until each of the motors in series received the full line current. This connection, then, was again changed by inserting and varying starting resistances in successive steps and by changing the connection of the motors, until they were in series-parallel; finally, steps were taken to change this connection until the full line potential was across the terminals of each motor.

An object of the present invention is to devise an extremely simple mechanical method of control in which advantages of constant voltage at the terminals of the generator are abandoned in favor of a large number of other advantages which will result therefrom.

The present system is especially intended for use with a power plant comprising a prime mover and a generator for each power consumption aggregate, immaterial how many motors are used in the aggregate, or whether the same are in series, series-parallel, or in parallel.

It is an object to attain flexibility in this system, in a high degree, by varying the voltage derived from the generator mechanically only and in accordance with the speed of the prime mover. The prime mover preferably is a combustion engine, suitable for operating at a relatively high efficiency even when not running at full speed. If, therefore, in a power plant of this character a prime mover in the form of a gas engine is combined with an ordinary direct current generator (preferably compound wound) and if at different speeds of the prime mover the E. M. F.'s set up respectively in the generator are used for driving the motors, the flexibility of the system allowing the introduction into the motors in any desired kind of connections is completely maintained.

The invention, therefore, relates to a method of mechanically controlling electrical power transmission at variable voltage and free of motor starting resistances, which in the known methods of power transmission control are successively either introduced into the circuit of the power consumption aggregate or which are successively cut out from said circuit.

The invention is described with reference to the accompanying drawing in connection with a power plant comprising the prime mover and the generator and in connection with a consumption aggregate comprising four motors. It is obvious, however, that many changes can be made within the spirit of the invention without deviating from the principle, as will be apparent from the following specification:

The drawing illustrates in side elevation an aggregate comprising a prime mover and generator in connection with a controller, and a plurality of motors, the controller contacts and motors being illustrated conventionally only.

The prime mover selected is a combustion engine 1 shown as having six cylinders inclosed in a cooling jacket and to which the fuel is supplied through a conduit indicated at 2, this fuel supply being absolutely controlled by a throttle 3 or by some other regulating device. The variation of the fuel supply to the engine, therefore, is adapted to vary the speed of the same between wide limits and from a zero or rest position to a maximum speed. In positive drive connection with this prime mover 1 a generator 4 is shown comprising in the embodiment illustrated (by way of example) an armature 5 and a compound wound field 6. While the drawing indicates a compound generator for these purposes, it is obvious that any other suitable construction of a generator may be used.

The two terminals of this generator are connected by suitable conductors 7 and 8 with terminals 9 and 10 of a controller. The controller is shown diagrammatically only. It comprises in addition to the terminals 9 and 10, stationary contacts 11 to 26 to which the terminals of the fields and armatures respectively of four series motors are connected. It also comprises a plurality of contact segments 27, arranged in groups and adapted to be brought in conductive connection with said controller contacts. These connections may be varied in accordance with 6 positions. Three positions A, B, and C at each side of a neutral position N are indicated, at which last named position the motors are entirely disconnected from the generator 4. The positions on one side of the neutral position N serve for imparting forward drive to the motors, while corresponding positions on the other side are used for the drive in reverse direction.

It will be seen that upon placing the contact group A of segments in connection with terminals 9 to 26, the motors are all in series, while in position B the motors are arranged in two groups in series connection, the two motors in each group being parallel to each other; and finally that in the position C all of the four motors are in multiple or parallel connection, and each of them receives the full voltage of the generator.

Supposing that the entire plant including the power consumption aggregate, that is the four motors, and the power producing aggregate, that is prime mover and generator, are placed in a traction locomotive and the locomotive is to be started up from rest, the throttle 2 is moved so as to admit fuel into the conduit of the engine, and the controller is placed in any one of the three positions A, B or C, preferably position B for conditions of normal load and level track. No matter what the maximum efficiency speed of the generator is, an E. M. F. will be set up in the generator as soon as the same is positively driven by the engine, this voltage naturally being considerably lower than the normal voltage for which the generator is actually designed. As there is, however, in this position, for instance position B, of the controller a load in the outer circuit, the relatively low E. M. F. will produce a current corresponding to said load, and current will flow through all of the motors at a relatively low voltage. As the voltage is low, owing to the reduced speed at the beginning, and as the resistance is relatively large, the wattage will not be excessive but will naturally be different from the normal wattage or output for which the generator is designed. This normal output will be furnished when the generator has assumed a certain speed and when a certain load is in the outer circuit. It is obvious, however, that the generator may be started and the motors thrown into its circuit with the controller in position A, that is, with all of the motors in series, even though the speed of the generator is far below normal. Position A is the preferred position of the controller when the starting conditions are difficult as to either load or grade or both.

The combustion engine 1 having started up with the generator 4 on its drive shaft will within very short time after suitable opening of the throttle impart the normal speed to the generator, that is, the speed for which this generator has been designed. If the vehicle has assumed a certain speed under these conditions, the prime mover then running at normal speed, and if it is desired to increase the speed of the traction locomotive by changing connections of the motors, say from series connection to a connection including a number of them in parallel, this may be accomplished by shutting off the throttle 2 of the prime mover 1, thereby interrupting the positive drive of the generator, and simultaneously with the throttle movement the controller may then be moved to the next position. This movement, however, must not necessarily be simultaneously with the throttle movement; it suffices if the throttle movement is not subsequent to the change of the controller positions.

During the interruption of the supply of fuel to the combustion engine which may be only a momentary interruption, the momentum which the generator then has assumed may cause the continued rotation of the same for a short interval and at reduced speed. The positive drive may be interrupted without completely interrupting the motion of the generator. When after alteration of the load the throttle 2 is opened again, an E. M. F. is then also immediately increased in the generator and current is again supplied to the outer circuit which current supply was interrupted during the switching operation. The resumed positive drive of the generator is then continued, and the motion of the generator thereby accelerated until the normal voltage is again produced.

It will be noted that the change from series connection of the motors to series-parallel or from series-parallel to pure parallel connection of the motors is enacted without inserting or varying any starting or compensating resistance in the field or armature circuits or in any other circuit of the power consumption aggregate.

If the series parallel connection is to be changed to parallel, the throttle 2 again is shut off, combined with or followed by an advance of the controller to the third position C and followed by reopening of the throttle. The throttle movement again will first interrupt the positive drive, but after reëstablishing this positive drive the generator will accelerate rapidly and, rapidly picking up the normal voltage, drive all of the motors under full power. Each motor then receives the full voltage and only the fourth part of the current produced by the generator.

The voltage of the generator being utilized from the time where this voltage is very low up to the time where it reaches its normal or maximum value, and load or resistance always being in the outer circuit whenever the generator is positively driven, it is obvious that there is always current produced in this outer circuit; this current will vary in accordance with the resistance of this outer circuit.

In the variable voltage system of the present invention a disconnection of the power consumption aggregate from the power producing aggregate can be effected more readily and with less danger to the entire apparatus than in other self-contained power transmission plant for traction or other purposes. If, for instance, the motors are all connected in multiple with the terminals of the generator and if the entire unit is operating at full speed, and if then the throttle is shut off, the motors being all in multiple and being still running at full speed, no excessive currents or voltages can be set up, as the positive drive of the generator is interrupted and the prime mover will come to a standstill after very few revolutions at greatly reduced speed. If then the engine has been started again, it is only necessary to open the throttle of the combustion engine, and even if the generator has not been disconnected from the load, as by placing the controller into neutral position N, the generator will gradually and in short time pick up the load and send current through all of the motors.

It is also obvious in this method of elctrical power control that the elimination of one or more motors of the entire set will not have the same disturbing influence as under ordinary conditions with the customary controlled methods. If, for instance, three motors are out of use, only the multiple connection of the four motors could be used in the known systems after the two preceding steps of connecting the motors in series and series-parallel had been gone through. In the present method, however, the generator being positively driven by the prime mover and the entire control being only dependent upon the resumption and interruption of this positive drive, it is obvious that at the reduced speed of the prime mover upon starting a low voltage may be set up in the generator so that immediately after the establishment of the positive drive the single motor will operate without incurring any risks of burning out or breaking down.

In the transmission of electric power for hoisting and for numerous other purposes, the described method may be applied with the greatest advantage, and without any electric disturbances, excessive strains or other risks.

The present method of control is distinguished by its great simplicity and by its greatly reduced cost of operation and maintenance over any other methods of power control.

I claim:

1. A method of controlling electrical power transmission, which consists of driving a generator at different speeds to produce different voltages at the terminals of the generator, connecting across the terminals of the generator motors of predetermined resistance in varying connections, and interrupting the forcible drive of the generator between each two successive steps of motor connection in the outer circuit without braking the generator.

2. A method of controlling electrical power transmission, which consists of positively driving an electric generator, connecting a motor or motors across the terminals of the generator which motor or motors solely form the outer circuit of the generator, interrupting the positive drive of the generator and the outer circuit of the generator, altering the arrangement of the motors in the outer circuit, and reëstablishing the positive drive of said generator when the alterations in the outer circuit have been completed.

3. A method of controlling electrical power transmission, which consists of positively driving an electric generator, connecting a plurality of motors in series across the terminals of the generator, accelerating the motion of the generator until the same has attained a certain voltage, interrupting the positive drive of the generator, changing the connection of the motors in the outer circuit from a series connection to a connection including motors in parallel, and reestablishing the positive drive of the generator without having brought the generator to a stop during the interruption of the positive drive of the same.

4. In a method of controlling electrical power transmission, the steps of starting a generator from rest to a speed at which a voltage considerably below the normal voltage of the generator is produced, connecting a predetermined resistance in the form of motors across the terminals of the generator, continuing the drive of the generator until the normal voltage of the same is attained, interrupting the positive drive of the generator, altering the connection of the motors in the outer circuit from a series connection to a connection including motors in parallel, and reëstablishing the positive drive of the generator to supply current to the motors in their altered connection.

5. A method of controlling electrical power transmission, which consists of starting a generator, designed for a predetermined voltage, from a condition of rest to a speed at which an E. M. F. considerably below the voltage for which the generator has been designed is produced, throwing a resistance in the form of motors across the terminals of the generator to start said motors, continuing to drive the generator with the motors in its circuit until approximately the full voltage is produced within the generator, interrupting the positive drive of the generator without braking the same, disconnecting the outer resistance, re-connecting a resistance in a different form and of different value across the terminals of the generator, and reëstablishing the positive drive of the generator with the altered load in its circuit, all of the steps being taken without necessitating inserting resistance into, or cutting out resistance from the field of the generator, or the field of the motors to be driven by the generator.

6. A method of controlling electrical power transmission, which consists of imparting positive drive to a generator to produce a voltage therein in accordance with the speed of the drive and to set up a current therein dependent upon the load in the outer circuit, interrupting the positive drive of the generator, varying, without braking the motion of the generator, the motor resistance of the circuit, and reëstablishing the positive drive when the motor resistance has been altered.

7. In a method of controlling electrical power transmission, the steps of imparting positive drive at variable speeds to a generator designed for a predetermined normal voltage, throwing into the outer circuit of said generator a plurality of motors also designed for a normal voltage, said motors being thrown into the circuit of the generator when the speed at which the generator is running is not sufficient to set up the predetermined normal voltage, continuing the positive drive with the motors in the outer circuit of the generator until the speed of the generator is sufficient to set up the normal voltage, interrupting the positive drive of the generator without braking the motion of the same, altering the connections of the motors in the outer circuit, and reëstablishing the positive drive of the generator against the new load in the outer circuit.

8. A method of controlling electrical power transmission, which consists of imparting positive drive to a generator, connecting a plurality of motors in series across the terminals of the generator when the voltage produced by the generator is considerably below the normal voltage of the same to set up a torque in the motors at a voltage different from the voltage for which these motors have been designed, continuing to impart positive drive to the generator, interrupting the positive drive of the generator, altering the connections of the motors in the outer circuit to series-parallel connection of the same, reëstablishing the positive drive of the generator against the motors in series-parallel connection within the outer circuit, continuing to drive the generator positively with the motors in series-parallel connection, interrupting the positive drive of the generator, altering the connection of the motors in the outer circuit from series-parallel to parallel connection, reëstablishing positive drive of the generator against the motors in their new connection and continuing to drive the generator against the motors in their new connection.

9. A method of controlling electrical power transmission, which consists of imparting positive drive to a generator designed for a predetermined normal voltage, throwing a series of motors in series connection across the terminals of said generator when the generator has a speed at which a voltage far below the normal voltage of the same is produced to set up a torque under abnormal conditions within the motors of the outer circuit, accelerating the drive of the generator, interrupting the positive drive of the generator and simultaneously altering the connections of the motors in the outer circuit from series to series-parallel, reëstablishing the positive drive of the generator against the motors in the outer circuit in series-parallel connection, at a speed at which the normal voltage of the generator is not produced immediately upon the reëstablishment of the positive drive, accelerating the drive of the generator, interrupting the positive drive of the generator and simultaneously altering the connections of the motors in the outer circuit from series-parallel to parallel, reëstablishing the positive drive of the generator against the motors in the altered connection, and continuing to positively drive the generator against the motors in multiple connection until and after the speed suitable for production of the normal predetermined voltage in the generator is attained.

10. A method of controlling electrical power transmission, which consists of positively driving a generator at variable speed, successively altering the load resistance in the form of motors in the outer circuit and momentarily interrupting the positive drive of the generator between each two alterations without actually braking the motion of the generator.

11. A method of controlling electrical power transmission, which consists of imparting forcible drive to a generator at variable speed, altering intermittently the motor resistance of the power consumption aggregates in the outer circuit of the generator, interrupting the positive drive of the generator between each two alterations without interrupting the motion of the generator, the steps of altering the resistances of the power consumption aggregates being effected without altering the field resistance and without using external resistance in addition to said motor resistance.

12. A method of controlling electrical power transmission, which consists of imparting positive drive to a generator at variable speed, altering the resistance of the load consumption aggregates in the outer circuit of the generator, shutting off the positive drive of the generator before the generator is disconnected entirely from the outer circuit, and reëstablishing the positive drive after the load resistance has been altered.

13. A method of controlling electrical power transmission, which consists of starting a generator, designed for a predetermined voltage, from a condition of rest to a speed at which an E. M. F. considerably below the voltage for which the generator has been designed is produced, throwing a resistance in the form of motors across the terminals of the generator to start said motors, continuing to drive the generator with the motors in its circuit until approximately the full voltage is produced within the generator, interrupting the positive drive of the generator without electrically braking the same, disconnecting the outer resistance, re-connecting a resistance in a different form and of different value across the terminals of the generator, and reëstablishing the positive drive of the generator with the altered load in its circuit, all of the steps being taken without necessitating inserting resistance into, or cutting out resistance from the field of the generator, or the field of the motors to be driven by the generator.

14. A method of controlling electrical power transmission, which consists of imparting positive drive to a generator to produce a voltage therein in accordance with the speed of the drive and to set up a current therein dependent upon the load in the outer circuit, said load consisting of motor resistance exclusively, interrupting the positive drive of the generator, varying, without electrically braking the motion of the generator, the motor resistance of the circuit, and reëstablishing the positive drive when the motor resistance has been altered.

15. In a method of controlling electrical power transmission, the steps of imparting positive drive at variable speeds to a generator designed for a predetermined normal voltage, throwing into the outer circuit of said generator a plurality of motors also designed for a normal voltage, said motors being thrown into the circuit of the generator when the speed at which the generator is running is not sufficient to set up the predetermined normal voltage, continuing the positive drive with the motors in the outer circuit of the generator until the speed of the generator is sufficient to set up the normal voltage, interrupting the positive drive of the generator without electrically braking the motion of the same, altering the connections of the motors in the outer circuit, and reëstablishing the positive drive of the generator against the new load in the outer circuit.

16. A method of controlling electrical power transmission, which consists of positively driving a generator at variable speed, successively altering the load resistance in the form of motors in the outer circuit and interrupting the positive drive of the generator between each two load conditions without electrically braking the motion of the generator while the positive drive is interrupted.

17. A method of controlling electrical power transmission having different motor loads in the outer circuit, which consists of intermittently interrupting the positive drive of a generator and reëstablishing the positive drive against a different motor load without altering armature resistance, or field resistance of generator or motor, or without altering or introducing any other resistance of the entire system in the periods of non-positive drive.

18. A method of smoothly accelerating a vehicle driven by continuous current motors which consists in positively driving a dynamo, connecting a plurality of motors in series across the terminals of the dynamo, accelerating said dynamo evenly until it has attained substantially its rated voltage, interrupting the positive drive of the dynamo, changing the connections of the motors to one in which motors previously in series shall be in parallel, said change being made while the positive drive is interrupted, and quickly reëstablishing the positive drive, the dynamo being connected to a motor load only.

19. A method of smoothly accelerating a body driven by electric motors which consists in positively driving an electric generator, connecting a plurality of motors in series across the terminals of the generator, accelerating the motion of the generator until it has attained substantially the rated voltage, interrupting the positive drive of the generator, changing the connections of the motors to a connection including motors in parallel which were previously in series, the change being performed quickly and both the breaking of the first connection and the making of the second connection occurring while the positive drive is interrupted, and quickly reëstablishing the positive drive while the generator is running under its previously acquired momentum, the generator running freely while the positive drive is interrupted.

20. The method of controlling an electric power transmission system deriving its motive power from an electric generator positively driven by a prime mover and electric motors driven by the generator, which consists in connecting the motors in series with the generator while the generator is being positively driven, interrupting the positive drive, disturbing the electrical connections of the motors, by changing them to parallel, and reëstablishing the positive drive immaterial of the speed of the prime mover.

21. The method of accelerating commutator motors under load which consists in connecting a plurality of motors in series across the terminals of a dynamo driven by a prime mover, throttling the fluid supply of said prime mover, quickly disconnecting and reconnecting said motors so that motors previously in series shall be in parallel, said reconnection being made irrespective of the dynamo speed, and renewing the full fluid supply to the prime mover.

In testimony whereof I affix my signature.

HERBERT BRYAN EWBANK, Jr.

Copies of this patent may be obtained for five cents each, by addressing the "Commissioner of Patents, Washington, D. C."